Feb. 11, 1958        G. E. KOPASKA        2,822,940
COLLAPSIBLE ANIMAL RAMP FOR USE WITH TRUCKS AND THE LIKE
Filed Feb. 20, 1956        2 Sheets-Sheet 1
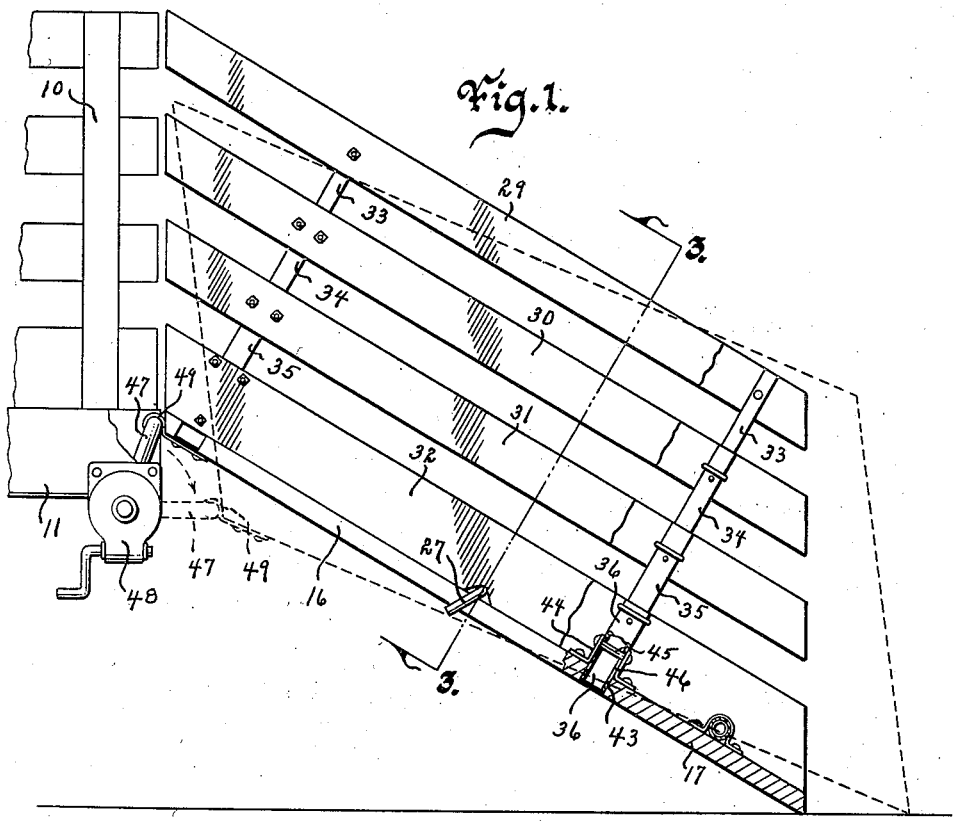
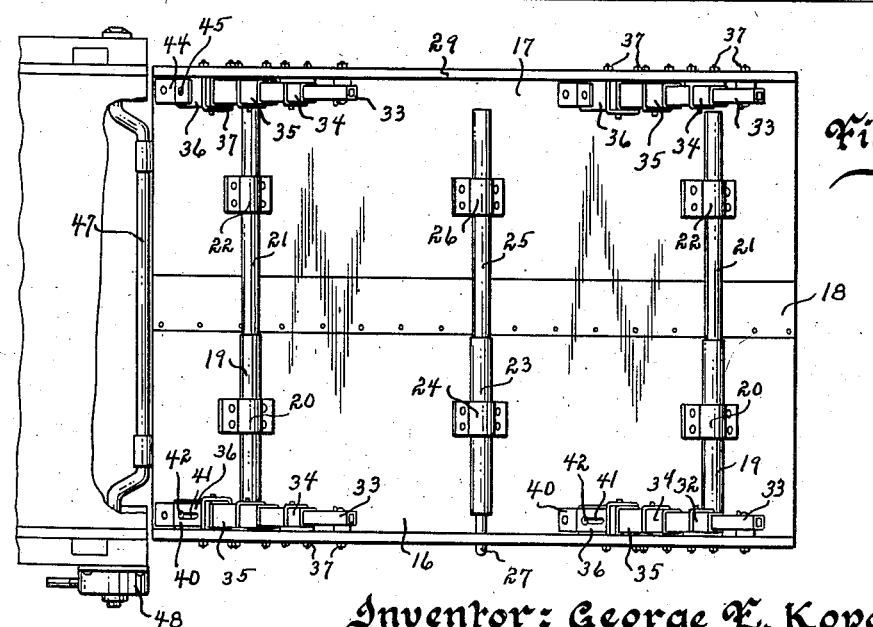
Witness
Edward P. Seeley
Inventor: George E. Kopaska
by M. Talbert Dick
Attorney Feb. 11, 1958 G. E. KOPASKA 2,822,940
COLLAPSIBLE ANIMAL RAMP FOR USE WITH TRUCKS AND THE LIKE
Filed Feb. 20, 1956 2 Sheets-Sheet 2
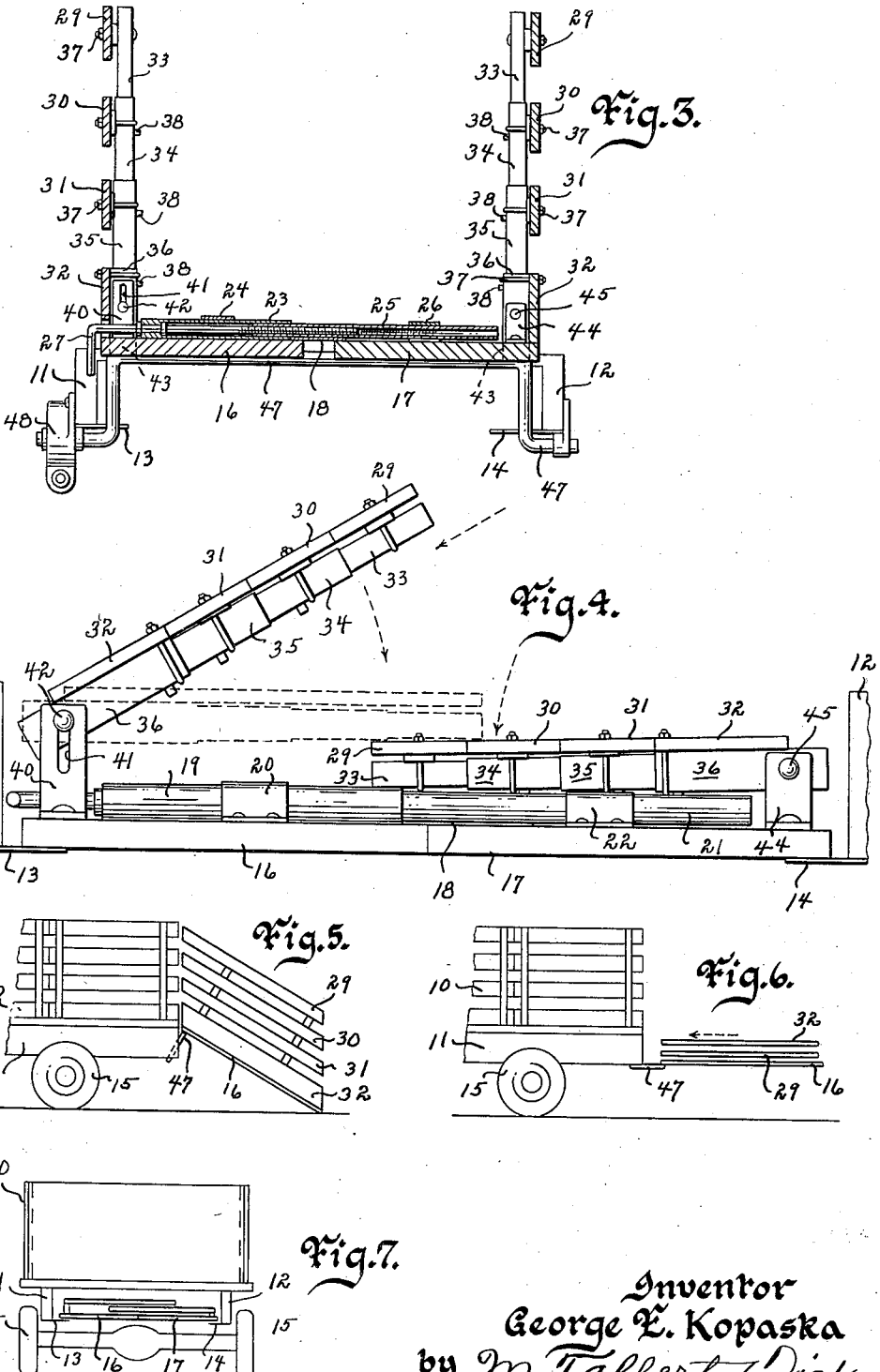

United States Patent Office 2,822,940
Patented Feb. 11, 1958

2,822,940

COLLAPSIBLE ANIMAL RAMP FOR USE WITH TRUCKS AND THE LIKE

George E. Kopaska, Guthrie Center, Iowa

Application February 20, 1956, Serial No. 566,544

4 Claims. (Cl. 214—85)

This invention relates to animal ramps for use in conjunction with vehicles such as animal hauling trucks and more specifically to a ramp that may be easily collapsed and stored in the frame chassis of the vehicle.

The transportation of animals such as hogs, sheep, cattle, horses and like from farm to market poses a substantial problem in loading and unloading the animals to and from the hauling vehicle. Rigid ramps are most often used. Such ramps are very bulky and cannot well be hauled with the animals. Usually the hauler will bring the ramp in the truck, load the animals and then leave the ramp, which must be later picked up. Obviously, this makes two separate trips and often more due to the fact that at one farm he may only get a partial load of animals but is unable to complete the load at another farm because of the lack of a ramp at the second farm.

Therefore, one of the principal objects of my invention is to provide a foldable ramp or chute that may be carried on the vehicle at all times.

More specifically the object of my invention is to provide a foldable ramp that when in collapsed condition may be carried within the chassis frame of the hauling vehicle.

A further object of this invention is to provide a collapsible ramp that may be set up or taken down by one person.

Still further objects of this invention are to provide a collapsible ramp that is economical in manufacture and durable in use.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Fig. 1 is a side view of my ramp in use on a truck body,

Fig. 2 is a top view of the device,

Fig. 3 is a cross sectional view of my ramp taken on line 3—3 of Fig. 1, and more fully illustrates its construction, Fig. 4 is an enlarged end view of the device being placed in a collapsed condition, Fig. 5 is a side diagrammatic view of the ramp associated with a vehicle and ready for use in getting animals into or out of the vehicle box, Fig. 6 is a diagrammatic side view of the unit folded and ready to be slid into the vehicle chassis for storage, and Fig. 7 is an end diagrammatic view of the device stored within the vehicle frame chassis.

While my foldable ramp may be used in conjunction with various types of vehicles, in the drawings I show it used with an ordinary truck. The numeral 10 designates the truck body or box. Supporting this hauling compartment is the vehicle chassis usually having the two spaced apart beams 11 and 12 running longitudinally of the box. If at the rear end of the vehicle there is a cross end brace between the beams, this should be removed for receiving my folded ramp, as shown in Fig. 7. These beams 11 and 12 are of such height as to provide sufficient room for storing my unit. Some of these beams have a bottom rim ledge but if one is not present I secure to the bottom of the two beams, ledge flanges 13 and 14. These ledge flanges support my folded unit when the same is slid between the two beams 11 and 12. If there are a series of cross braces on and below the beams 11 and 12, these ledge flanges are not mandatory although they facilitate the sliding of my device into and out of the vehicle chassis frame structure. The numeral 15 designates the wheels of the vehicle.

It is to such a structure that I employ my ramp or chute and which I will now describe in detail. The bottom floor of my unit has two main longitudinal side by side sections 16 and 17. The numeral 18 designates an elongated plate secured to the top of one of the floor sections by screws or like and having its width extending over the other section, as shown in Fig. 2. The numeral 19 designates a plurality of pipes transversely arranged on the section 16, and held thereto by clamp means 20. The numeral 21 designates a like number of pipes or rods secured by clamp means 22 to the section 17 and having their ends slidably telescoping into the pipes 19 respectively. Thus the sections 16 and 17 will be slidably secured together and may be moved laterally relative to each other for expanding or decreasing the width of the floor. In case the floor is widened, by moving the sections 16 and 17 away from each other, the plate 18 will cover the space between the two sections. Any suitable means may be used to separate the two sections or to bring them together. In the drawings I show a pipe unit 23 secured by the clamp means 24 to the center length of the section 16. The numeral 25 designates a pipe secured on the section 17 by clamp means 26 having its inner end slidably extending into the pipe 23. The numeral 27 designates a crank rod having a part of its length rotatably mounted but not slidable in the pipe 23. The inner end portion of this rod is threaded into the inner end portion of the pipe 25. By this arrangement when the crank arm is rotated in one direction the floor width will be expanded and when rotated in the other direction, the floor width will be reduced. In handling large animals, the floor width may well be expanded. However, prior to the storage of the unit between the two chassis beams 11 and 12, the width of the floor must be at a minimum in order to slide into the space between the two beams.

At each side of the ramp floor is a hinged wing. Each wing has a plurality of boards or like 29, 30, 31 and 32. Each top board 29 has two spaced apart transversely arranged shafts 33, rectangular in cross section. Each shaft 33 extends slidably downwardly into a pipe 34, rectangular in cross section and secured to the board 30 below the board 29. Each of these pipes 34 has its lower end portion sliding into a pipe 35, rectangular in cross section and secured to the next lower board 31. Each pipe 35 extends downwardly to slide into the pipe 36, rectangular in cross section and secured to the bottom board 32. These telescoping pipes 33, 34, 35 and 36 may be secured to the boards in any suitable manner such as by U-bolts 37. Pin means 38 may be used to limit the telescoping of the pipes. Any number of pins 38 may be used, i. e., one may be used in each of the members 34, 35 and 36. When the pins are removed the boards 29, 30, 31 and 32 may be slid together to provide a compact wall, as shown in Fig. 4. Obviously, this is necessary to reduce the height of the wings so that when folded onto the floor portion they may be placed for storage between the two chassis beams. In loading livestock, a high slotted wing wall may be needed and when such is the case the boards are pulled apart and the pin means inserted so that the boards will remain in such expanded condition while in use. The boards may be longitudinally adjustable if desired. At least they protrude further forward as they progress upwardly to meet the rear side ends of the vehicle as shown in Fig. 1. The treatment of hinging the wings to the ramp flooring may vary. In the drawings I show the left side wing hinge means of somewhat modified structure from that of the right side wing hinge means. Of the left side wing I show each of the pipes 36 associated with a bearing member 40 secured to the floor section 16 near its outer side edge. Each of these bearing members has a vertical slot arrangement 41 in its two ear portions. A bolt, pin, or rivet 42 extends through the slot means and the adjacent pipe 36, as shown in Fig. 4. By this arrangement the left side wing may be slidably moved upwardly or downwardly relative to the ramp floor, or moved upwardly therefrom, and laid horizontally over the ramp floor. Various means may be used to hold the side wings vertically while in use. In the case of the member 36, I provide a hole or well 43 in the floor and directly below it when it is vertical as shown in Fig. 3. The side wing is raised relative to the bearing member, placed vertically and then forced downwardly so that the lower end of the part 36 extends into the opening 43. When in such position the side wing will be held vertical. A similar means is found for the right side wing. The bearing 44 is similar to the bearing 40. The rivet, bolt or like 45, however, is rigid with the bearing member but passes through a slot 46 in the member 36, as shown in Fig. 1. This structure also permits the members 36 on the right side, i. e., along the outer edge of the bottom floor section 17 to be vertically positioned to drop into the well or hole 43 adjacent the bearing 44, as shown in Fig. 1. These holes 43 may be metal lined or embraced for strength.

To fold my device the right side wing is raised to clear the adjacent holding holes 43 and then the wing is folded down onto and over the ramp floor as shown in Fig. 4. Next the left side wing is raised to free the adjacent holding wells 43 and further raised so that when it is folded it may extend over the already folded right wing as shown by the broken lines in Fig. 4. When the device is so collapsed, it may be slid for storage and transportation between the chassis beams 11 and 12 and above the support plates 13 and 14, as shown in Fig. 7.

To remove the device for use it is slid rearwardly. I have provided a U-bar 47 rotatably mounted on the rear chassis frame. This lifting U-bar may be rotated by a crank means 48. Prior to the withdrawal of my unit, this bar is placed to extend horizontally rearwardly, as shown by broken lines in Fig. 1. On the forward bottom of my unit I have provided the hooks 49. The unit is slid out and back until these hooks 49 engage the U-bar 47. The rear end of the unit is lowered to the ground surface and then by cranking the U-bar to an upright position the forward end of the unit will be raised, moved to and held adjacent the floor of the truck body 10. Next the wings are unfolded to vertical positions and dropped into the vertical holding wells 43. The device is then ready for use.

Some changes may be made in the construction and arrangement of my collapsible animal ramp for use with trucks and like without departing from the real spirit and purpose of my invention, and it is my intention to cover by my claims, any modified forms of structure or use of mechanical equivalents which may be reasonably included within their scope.

I claim:

1. In a collapsible ramp, an inclined floor portion, a wing for each side of said floor portion, hinge means units for securing said two wings to the two side edge portions of said floor portion, a locking means incorporated in each hinge means unit for holding the wing to which it is operatively secured in a vertical condition at times, and a means for detachably securing the upper end of said floor portion to a vehicle bed.

2. In a collapsible ramp, an inclined floor portion, a wing for each side of said floor portion, a plurality of shafts on each of said wings, a means for slidably hinging each of said shafts to said floor portion, a retaining well in said floor portion adjacent each of said shafts; said wings comprising a plurality of boards and said plurality of shafts each being of telescoping construction, and a means for holding each of said shafts in extended condition.

3. In combination, a vehicle having a box, and two spaced apart longitudinally extending chassis beams below said box, a horizontal inwardly extending flange on each of said beams, and a foldable ramp capable of being stored between said two beams and on said flanges when in folded condition; said ramp having a floor portion expandable in width and two side wing portions capable of being folded over said floor portion.

4. In combination, a vehicle having a box, and two spaced apart longitudinally extending chassis beams below said box, a horizontal inwardly extending flange on each of said beams, a foldable ramp capable of being stored between said two beams and on said flanges when in folded condition, a U-bar rotatably mounted on the rear end of said vehicle, a means for rotating said U-bar, and hooks on the forward bottom of said ramp capable of engaging said U-bar whereby the rotation of the U-bar will lower or raise the front end of said ramp.

References Cited in the file of this patent

UNITED STATES PATENTS

| | | |
|---|---|---|
| 1,105,004 | Smith | July 28, 1914 |
| 1,665,493 | De Roos | Apr. 10, 1928 |
| 1,782,554 | Tool | Nov. 25, 1930 |
| 2,215,631 | Young | Sept. 24, 1940 |
| 2,228,946 | Carter | Jan. 14, 1941 |
| 2,584,396 | Naekel | Feb. 5, 1952 |